(12) United States Patent
Gupta et al.

(10) Patent No.: US 10,951,494 B1
(45) Date of Patent: Mar. 16, 2021

(54) APPARATUS, SYSTEM, AND METHOD FOR SELF-REGULATING SAMPLING DOMAINS WITHIN NETWORK DEVICES

(71) Applicant: Juniper Networks, Inc., Sunnyvale, CA (US)

(72) Inventors: Aayush Gupta, New Delhi (IN); Manikandan Musuvathi Poornachary, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 120 days.

(21) Appl. No.: 16/169,261

(22) Filed: Oct. 24, 2018

(51) Int. Cl.
*H04L 12/26* (2006.01)
*H04L 12/707* (2013.01)

(52) U.S. Cl.
CPC ............ *H04L 43/024* (2013.01); *H04L 43/04* (2013.01); *H04L 43/16* (2013.01); *H04L 45/22* (2013.01)

(58) Field of Classification Search
CPC ..... H04L 43/024; H04L 43/026; H04L 43/04; H04L 43/022; H04L 43/103; H04W 24/02
See application file for complete search history.

(56) References Cited

U.S. PATENT DOCUMENTS

| 2019/0058641 A1* | 2/2019 | Mirzazad Barijough ................... H04L 43/026 |
| 2020/0028771 A1* | 1/2020 | Wong .................. H04L 41/0816 |

* cited by examiner

*Primary Examiner* — Elton Williams
(74) *Attorney, Agent, or Firm* — FisherBroyles, LLP

(57) ABSTRACT

A disclosed method may include (1) sampling, by way of at least one CPU on a network device, packets traversing a network in connection with at least one communication session that involves computing devices, (2) calculating a total number of packets sampled by way of the CPU over a certain period of time, (3) identifying a sampling threshold that represents a target number of packets to be sampled by way of the CPU over the certain period of time, (4) determining that the total number of packets sampled over the certain period of time exceeds the sampling threshold, and in response to determining that the total number of packets sampled exceeds the sampling threshold, (5) decreasing a sampling rate at which the CPU is to sample subsequent packets traversing the network in connection with the communication session. Various other systems and methods are also disclosed.

19 Claims, 7 Drawing Sheets

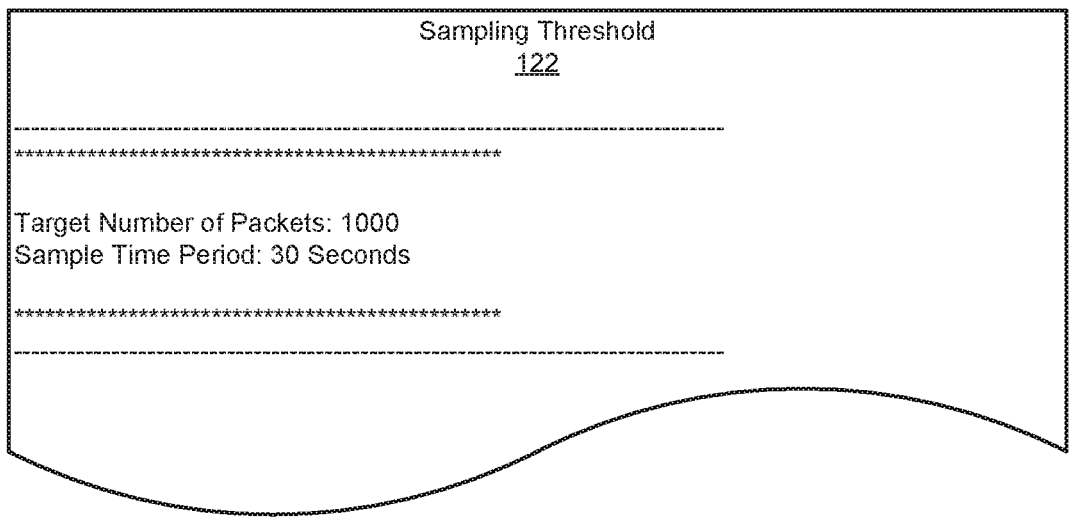
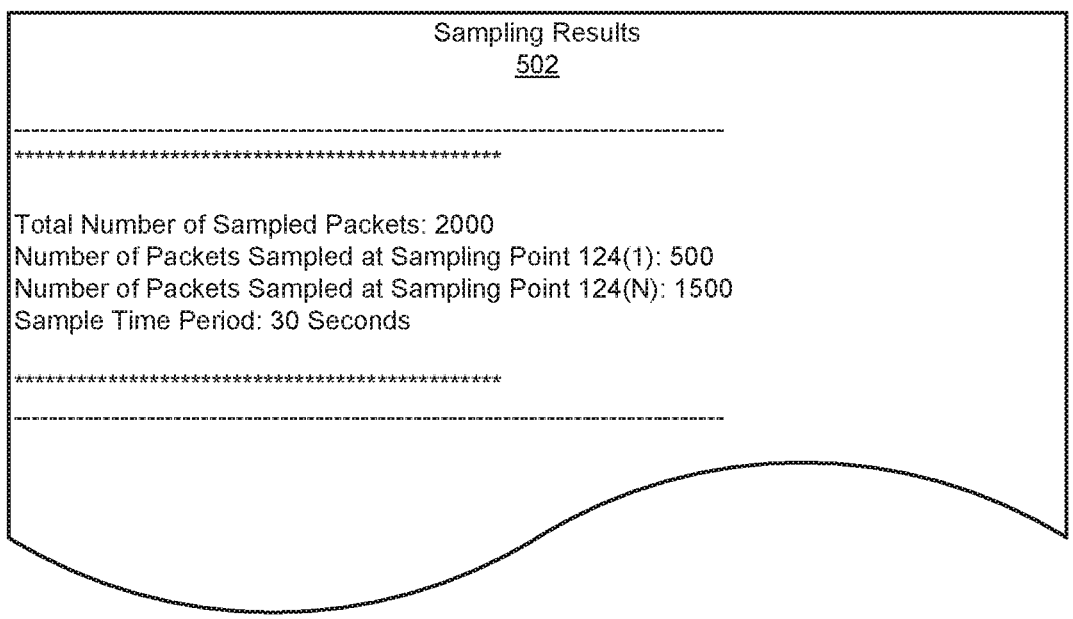
FIG. 5

US 10,951,494 B1

APPARATUS, SYSTEM, AND METHOD FOR SELF-REGULATING SAMPLING DOMAINS WITHIN NETWORK DEVICES

BACKGROUND

Network devices (such as routers and switches) are often used to forward traffic within a network and/or across networks. These network devices may represent and/or form the infrastructure of such networks. Network administrators and/or the network devices themselves may be interested in analyzing the traffic passing through the network for various reasons. For example, network devices may perform traffic analyses to gain insight into the types and/or amounts of traffic that they handle. Additionally or alternatively, these network devices may perform such traffic analyses to evaluate network utilization, the contents of packets included in the traffic, the upload and/or download speeds of the traffic, and/or the origins and/or destinations of the traffic.

Unfortunately, these traffic analyses may consume significant computing power and/or resources. As a result, such traffic analyses may, if not properly regulated, impair the performance and/or behavior of the network devices handling the traffic. For example, in some traditional contexts, network devices may carry out much of the traffic analyses by way of their Central Processing Units (CPUs). As part of these traffic analyses, the network devices may sample a certain ratio of packets. If the sampling rate is too high, the network devices may be dedicating too much CPU usage to the traffic analyses, thereby reducing the network devices' ability to handle, direct, and/or forward traffic at peak performance levels. The instant disclosure, therefore, identifies and addresses a need for additional and improved apparatuses, systems, and methods for self-regulating sampling domains within network devices.

SUMMARY

As will be described in greater detail below, the instant disclosure generally relates to apparatuses, systems, and methods for self-regulating sampling domains within network devices. In one example, a method for accomplishing such a task may include (1) sampling, by way of at least one CPU on a network device a set of packets traversing a network in connection with at least one communication session that involves a plurality of computing devices, (2) calculating a total number of the packets sampled by way of the CPU over a certain period of time, (3) identifying a sampling threshold that represents a target number of packets to be sampled by way of the CPU over the certain period of time, (4) determining that the total number of packets sampled over the certain period of time exceeds the sampling threshold, and then in response to determining that the total number of packets sampled exceeds the sampling threshold, (5) decreasing a sampling rate at which the CPU is to sample subsequent packets traversing the network in connection with the communication session that involves the plurality of computing devices.

Similarly, a system that implements the above-identified method may include a CPU configured to execute various modules stored in memory on a network device. In one example, this system may include and/or execute (1) a sampling module that samples, by way of the CPU on the network device, a set of packets traversing a network in connection with at least one communication session that involves a plurality of computing devices, (2) a calculating module that calculates a total number of the packets sampled by way of the CPU over a certain period of time, (3) a threshold module that (A) identifies a sampling threshold that represents a target number of packets to be sampled by way of the CPU over the certain period of time and (B) determines that the total number of packets sampled over the certain period of time exceeds the sampling threshold, and (4) a rate module that decreases a sampling rate at which the CPU is to sample subsequent packets traversing the network in connection with the communication session in response to the determination that the total number of packets sampled exceeds the sampling threshold.

Additionally or alternatively, an apparatus that implements the above-identified method may include at least one physical CPU that is communicatively coupled to at least one physical network interface. In one example, this physical CPU may (1) sample a set of packets traversing the network in connection with the communication session that involves the plurality of computing devices, (2) calculate a total number of the packets sampled over a certain period of time, (3) identify a sampling threshold that represents a target number of packets to be sampled over the certain period of time, (4) determine that the total number of packets sampled over the certain period of time exceeds the sampling threshold, and then (5) decrease a sampling rate at which the CPU is to sample subsequent packets traversing the network in connection with the communication session in response to the determination that the total number of packets sampled exceeds the sampling threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary information that identifies and/or represents a sampling threshold and sampling results.

Figure 1:
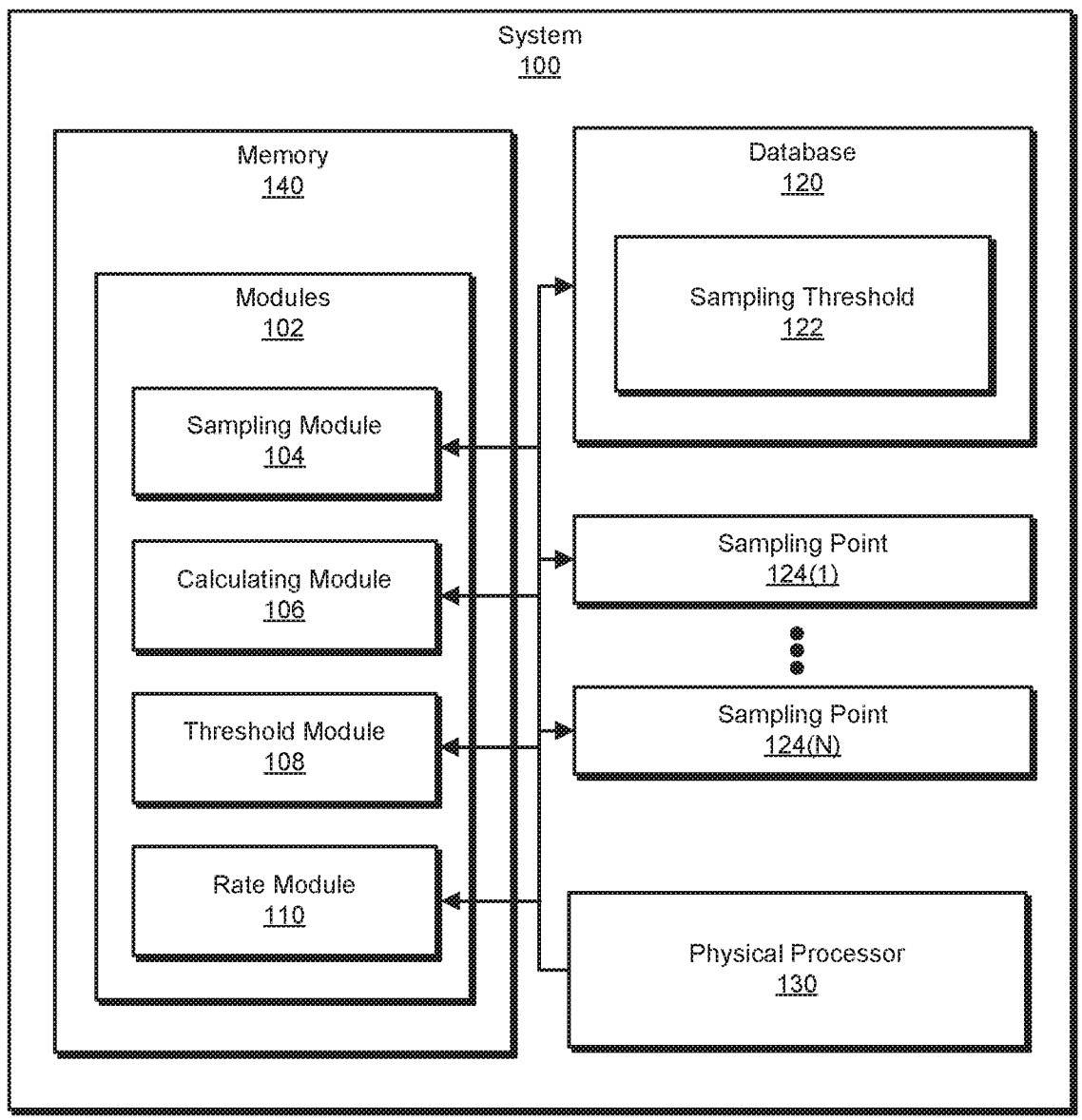
FIG. 1 is a block diagram of an exemplary system for self-regulating sampling domains within network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for self-regulating sampling domains within network devices. As will be explained in greater detail below, embodiments of the instant disclosure may facilitate the regular and/or ongoing sampling of traffic handled by network devices. In particular, embodiments of the instant disclosure may involve setting and/or configuring a sampling threshold that serves as a target number and/or ratio of packets to be sampled by way of a network device's CPU over a certain period of time. After having sampled a set of packets over that period of time, these embodiments may involve calculating the total number of packets sampled by the CPU.

In the event that the number of sampled packets is above the sampling threshold, these embodiments may involve decreasing the sampling rate at which the CPU is to sample such packets in the future. Conversely, in the event that the number of sampled packets is below the sampling threshold, these embodiments may involve increasing the sampling rate at which the CPU is to sample such packets in the future. By doing so, these embodiments may stabilize CPU usage in connection with the processing and/or sampling application, provide reasonably accurate statistics about the volume of traffic traversing different sampling domains within the network device, and/or regulating the sampling rates of different sampling domains to a certain target and/or goal.

Figure 2:
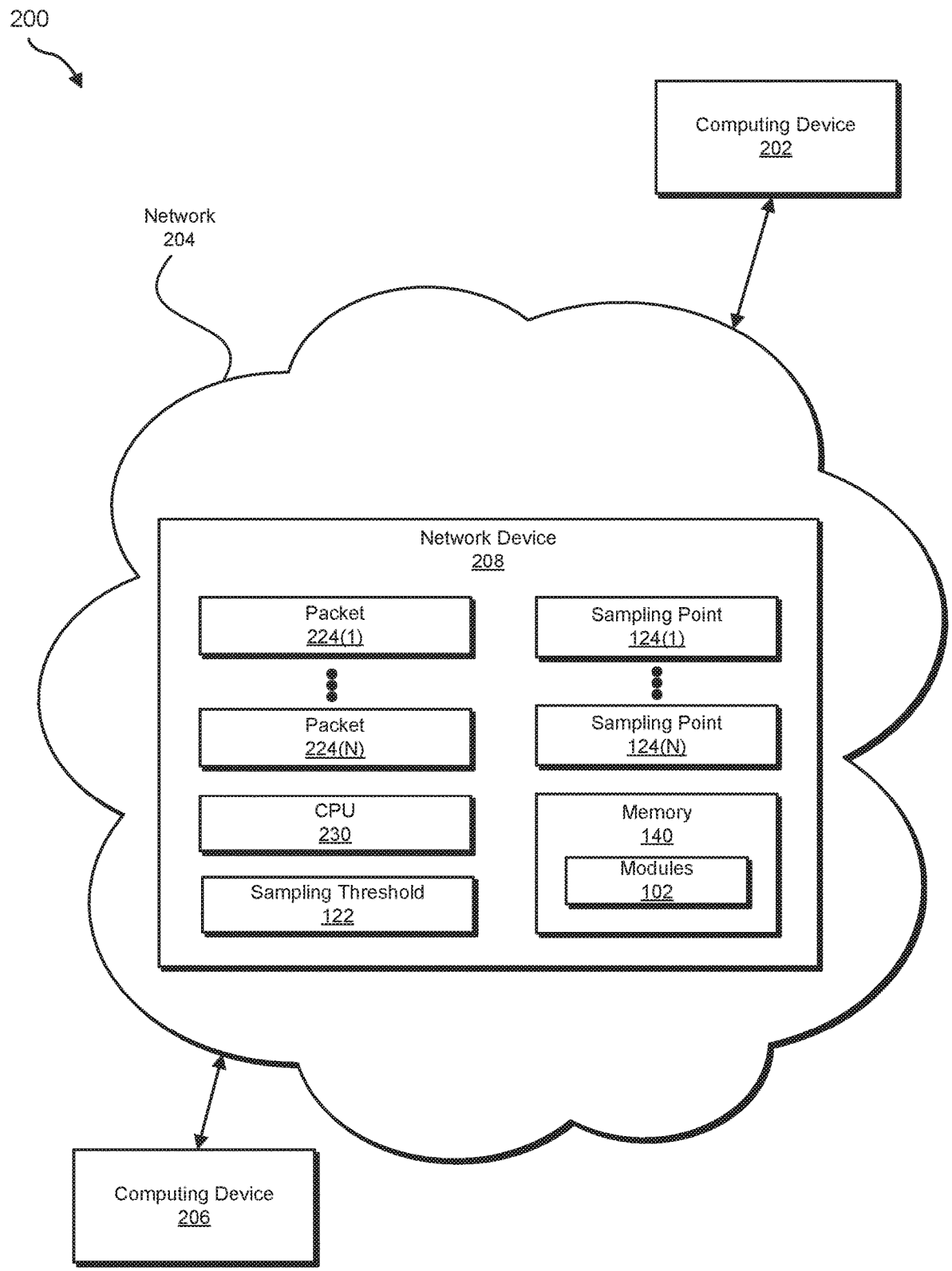
FIG. 2 is a block diagram of an exemplary implementation of an apparatus for self-regulating sampling domains within network devices.
Figure 3:
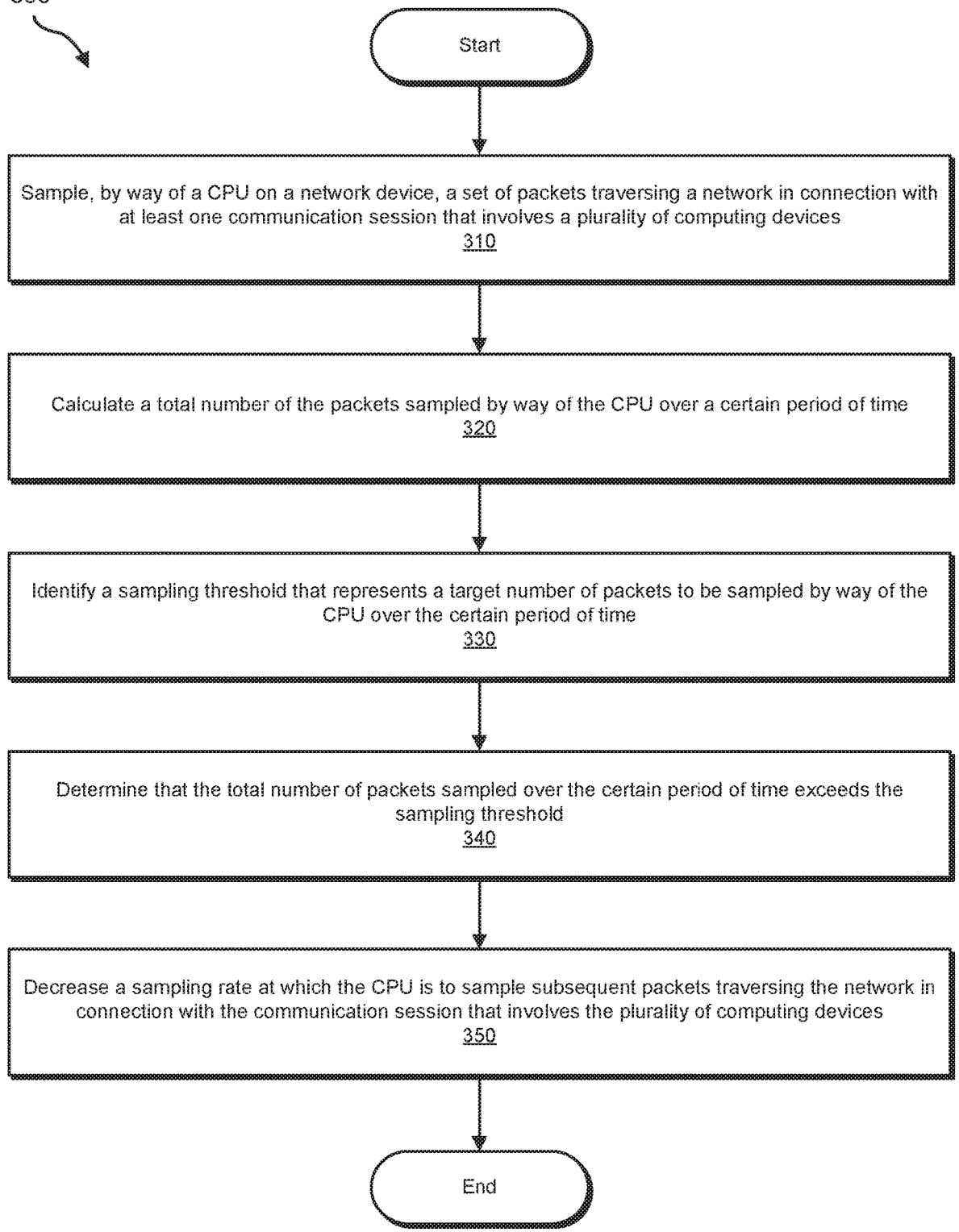
FIG. 3 is a flow diagram of an exemplary method for self-regulating sampling domains within network devices.
Figure 4:
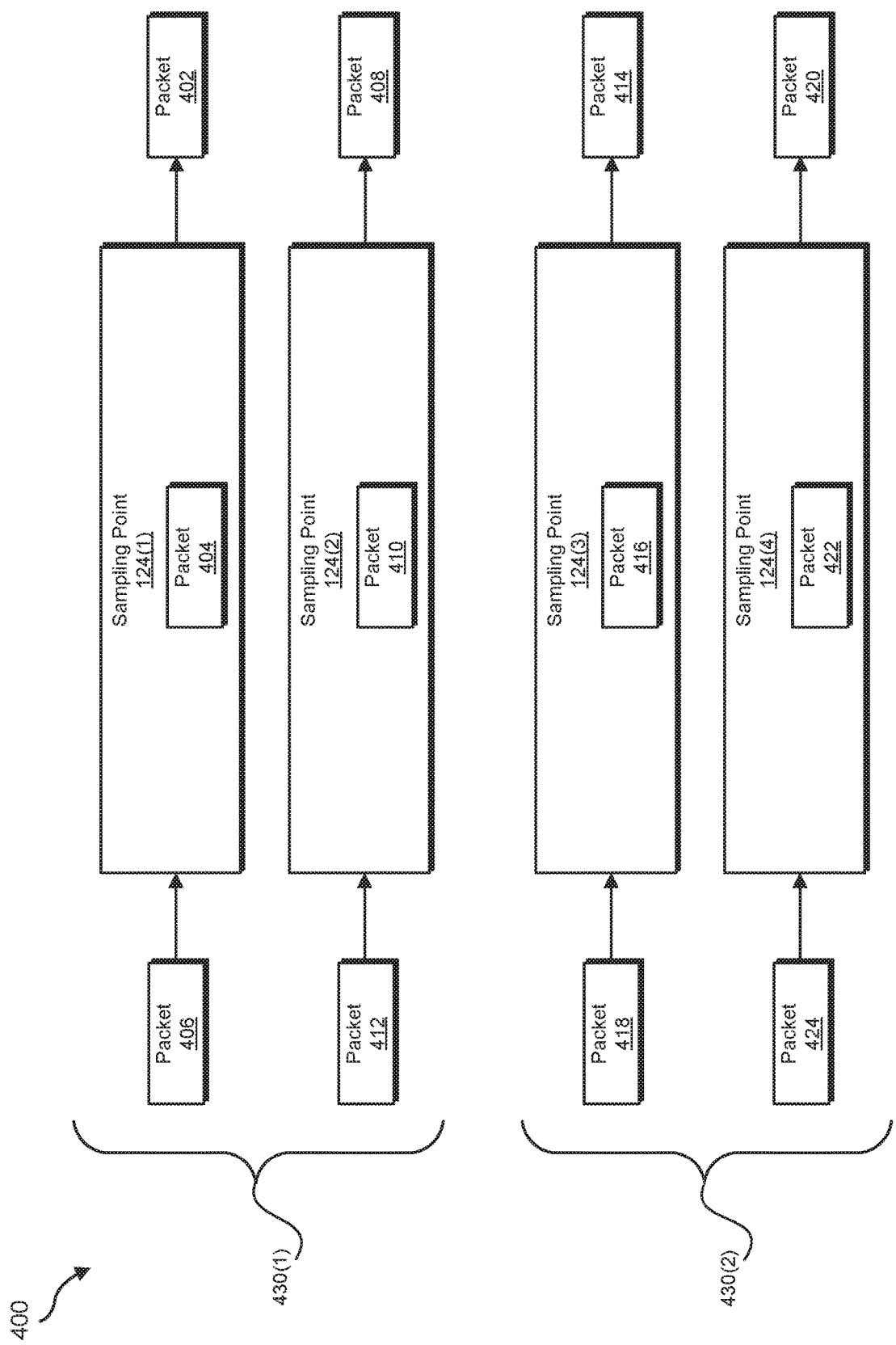
FIG. 4 is a block diagram of exemplary sampling domains that include multiple sampling points.

The following will provide, with reference to FIGS. 1, 2, and 4, detailed descriptions of exemplary apparatuses, systems, and corresponding implementations for self-regulating sampling domains within network devices. Detailed descriptions of corresponding computer-implemented methods will be provided in connection with FIG. 3. Detailed descriptions of exemplary sampling thresholds and sampling results will be provided in connection with FIGS. 5 and 6. In addition, detailed descriptions of an exemplary computing system for carrying out these methods will be provided in connection with FIG. 7.

FIG. 1 shows an exemplary system 100 that facilitates self-regulating sampling domains within network domains. As illustrated in FIG. 1, system 100 may include one or more modules 102 for performing one or more tasks. As will be explained in greater detail below, modules 102 may include a sampling module 104, a calculating module 106, a threshold module 108, and a rate module 110. Although illustrated as separate elements, one or more of modules 102 in FIG. 1 may represent portions of a single module or application (such as an operating system, a processing application, and/or a sampling application) running on a CPU, a routing engine, a field-replaceable unit, a packet forwarding engine, and/or any other suitable component within a network device.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 206, and/or network device 208). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to self-regulate sampling domains within network devices. Examples of physical processor 130 include, without limitation, CPUs, microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more databases, such as a database 120. In some examples, database 120 may store and/or maintain a sampling threshold 122. In these examples, sampling threshold 122 may correspond to and/or represent a target number of packets to be sampled by way of physical processor 130 and/or a CPU over a certain period of time. In one example sampling threshold 122 may be formatted and/or represented as a fixed number. Additionally or alternatively, sampling threshold 122 may be formatted and/or represented as a 1-to-N ratio in which one packet is sampled for every N packets handled by the network device in connection with the communication session that involves the plurality of computing devices.

As illustrated in FIG. 1, exemplary system 100 may additionally include one or more sampling points, such as sampling points 124(1)-(N). The term "sampling point," as used herein, generally refers to any type or form of interface, component, and/or device at which packets traversing a network device are intercepted and/or sampled. In some examples, sampling points 124(1)-(N) may correspond to and/or represent a physical interface at which packets are selected and/or intercepted from a communication session between computing devices within a network. In such examples, upon selecting and/or intercepting those packets, sampling points 124(1)-(N) may forward and/or pass the same to physical processor 130 and/or a CPU for processing, computation, and/or analysis. Examples of sampling points 124(1)-(N) include, without limitation, packet forwarding engines, routing engines, Physical Interface Cards (PICs), Flexible PIC Concentrators (FPCs), Switch Interface Boards (SIBs), control boards, communication ports, fan trays, connector interface panels, line cards, egress interfaces, ingress interfaces, portions of one or more of the same, combinations or variations of one or more of the same, and/or any other suitable sampling points.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network device 208 in communication with a computing device 202 and/or a computing device 206 via a network 204. In one example, network 204 may include and/or incorporate a network device 208. Network device 208 may also include and/or incorporate memory 140 and a CPU 230. In this example, CPU 230 may execute one or more of modules 102 stored in memory 140 for the purpose of self-regulating sampling domains within network devices. In addition, network device 208 may include and/or provide sampling points 124(1)-(N).

For example, and as will be described in greater detail below, one or more of modules 102 may cause network device 208 to (1) sample a set of packets traversing the network in connection with the communication session that involves the plurality of computing devices, (2) calculate a total number of the packets sampled over a certain period of time, (3) identify a sampling threshold that represents a target number of packets to be sampled over the certain period of time, (4) determine that the total number of packets sampled over the certain period of time exceeds the sampling threshold, and then (5) decrease a sampling rate at which the CPU is to sample subsequent packets traversing the network in connection with the communication session in response to the determination that the total number of packets sampled exceeds the sampling threshold.

Network device 208 generally represent any type or form of physical computing device capable of reading computer-executable instructions and/or handling network traffic. In one example, network device 208 may include and/or represent a router (such as a provider edge router, hub router, spoke router, autonomous system boundary router, and/or area border router) that receives, routes, forwards, and/or otherwise handles network traffic. Additional examples of network device 208 include, without limitation, switches, hubs, modems, bridges, repeaters, gateways multiplexers, network adapters, network interfaces, laptops, tablets, desktops, servers, cellular phones, Personal Digital Assistants (PDAs), multimedia players, embedded systems wearable devices, gaming consoles, variations or combinations of one or more of the same, and/or any other suitable network devices. An apparatus for self-regulating sampling domains within network devices may include and/or represent all or a portion of network device 208.

Network 204 generally represents any medium or architecture capable of facilitating communication or data transfer. In one example, network 204 may facilitate communication between network device 208 and computing device 202 and/or computing device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, computing devices 202 and 206 may each represent a portion of network 204 and/or be included in network 204.

Computing devices 202 and 206 generally represents any type or form of computing device capable of reading computer-executable instructions. In one example, computing devices 202 and 206 may include and/or represent client devices involved and/or engaged in a communication session with one another. In another example, computing devices 202 and 206 may include and/or represent a network device (such as a router and/or switch) that handles and/or forwards traffic within a network and/or across networks. Additional examples of computing devices 202 and 206 include, without limitation, end-point devices, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

FIG. 3 is a flow diagram of an exemplary computer-implemented method 300 for self-regulating sampling domains within network devices. The steps shown in FIG. 3 may be performed by any suitable computer-executable code and/or computing system, including system 100 in FIG. 1, system 200 in FIG. 2, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may sample, by way of at least one CPU on a network device, a set of packets traversing a network in connection with at least one communication session that involves a plurality of computing devices. For example, sampling module 104 may, as part of network device 208 in FIG. 2, sample packets 224(1)-(N) in FIG. 2 as they traverse network 204 in connection with at least one communication session that involves computing devices 202 and 206. In one example, network device 208 may perform and/or execute the sampling of such packets by way of and/or via CPU 230.

The systems described herein may perform step 310 in a variety of ways and/or contexts. In some examples, sampling module 104 may intercept and/or collect packets 224(1)-(N) at sampling points 124(1)-(N) within network device 208. For example, sampling module 104 may identify a sampling rate set for and/or applied to the packets traversing through sampling points 124(1)-(N) as part of the communication session involving computing devices 202 and 206. In one example, the sampling rate may be formatted and/or represented as a 1-to-N ratio in which one packet is sampled for every N packets passing through sampling points 124(1)-(N) in connection with the communication session. Sampling module 104 may select 1 packet out of every N packets that pass through one or more of sampling points 124(1)-(N) and then flag that packet for processing and/or inspection.

In some examples, sampling module 104 may direct and/or cause the selected and/or sampled packets to undergo processing and/or inspection at sampling points 124(1)-(N). Additionally or alternatively, sampling module 104 may direct and/or cause the selected and/or sampled packets to undergo processing and/or inspection at a centralized and/or management component (e.g., physical processor 130 and/or CPU 230) within network device 208.

In other words, the sampling may involve an interception phase and/or a processing phase. The interception phase may be performed and/or executed by and/or at sampling points 124(1)-(N). In one example, the processing phase may, like the interception phase, be performed and/or executed by and/or at sampling points 124(1)-(N). Additionally or alternatively, the processing phase may, unlike the interception phase, be performed and/or executed by and/or at a CPU that is separate from sampling points 124(1)-(N).

In a specific example, the sampling rate may be configured as a 1-to-1,000 ratio in which 1 packet is sampled at each sampling point for every 1,000 packets passing through each sampling point. In this example, sampling module 104 may direct and/or cause sampling point 124(1) to select and/or intercept 1 packet out of every 1,000 packets passing through sampling point 124(1) and then forward each selected and/or intercepted packet to CPU 230 for processing. Similarly, sampling module 104 may direct and/or cause sampling point 124(N) to select and/or intercept 1 packet out of every 1,000 packets passing through sampling point 124(N) and then forward each selected and/or intercepted packet to CPU 230 for processing.

Alternatively, rate module 110 may establish and/or apply different sampling rates across the various sampling points. For example, a sampling rate applied to sampling point 124(1) may be configured as a 1-to-500 ratio in which 1 packet is sampled at sampling point 124(1) for every 500 packets passing through sampling point 124(1). In this example, a sampling rate applied to sampling point 124(N) may be configured as a 1-to-2,000 ratio in which 1 packet is sampled at sampling point 124(N) for every 2,000 packets passing through sampling point 124(N). Accordingly, sampling module 104 may direct and/or cause sampling point 124(1) to select and/or intercept 1 packet out of every 500 packets passing through sampling point 124(1) and then forward each selected and/or intercepted packet to CPU 230 for processing. In contrast, sampling module 104 may direct and/or cause sampling point 124(N) to select and/or intercept 1 packet out of every 2,000 packets passing through sampling point 124(N) and then forward each selected and/or intercepted packet to CPU 230 for processing.

In other examples, each sampling point may include and/or implement a CPU that performs the interception phase and/or the processing phase. In these examples, sampling points 124(1)-(N) may be able to perform all phases of sampling themselves without outsourcing and/or delegating certain responsibilities to other components external to sampling points 124(1)-(N) within network device 208.

In some examples, embodiments of the instant disclosure may be especially beneficial and/or constitute a significant improvement for network devices that do not include and/or incorporate a hardware-accelerated sampling device, such as an Application Specific Integrated Circuit (ASIC), that is dedicated to sampling packets. For example, some network devices may include and/or incorporate a hardware-accelerated sampling device that is dedicated to sampling packets. In such situations, those network devices with hardware-accelerated sampling devices may be able to achieve the desired sampling of packets without necessitating increased CPU usage by simply directing the hardware-accelerated sampling device to export the sampled packets to a collector that processes the sampled packets, stores the packets for processing, and/or maintains information about the sampled packets within a file system.

However, other network devices without any hardware-accelerated sampling devices may rely on CPUs to uplift sampled packets to an intermediary processing application that modifies the sampled packets prior to forwarding the same to the collector. This uplifting of the sampled packets to the intermediary processing application may significantly increase the CPU usage, thereby reducing the network devices' ability to handle, direct, and/or forward traffic at peak performance levels. In an effort to mitigate the impact on the network devices' performance, the various embodiments described herein may be able to regulate the sampling domains of the network devices even though CPUs are used to uplift the sampled packets to the intermediary processing application prior to arriving at the collector.

In one example, sampling module 104 may determine that network device 208 lacks a hardware-accelerated sampling device dedicated to sampling packets handled by network device 208 in connection with the communication session that involves computing devices 202 and 206. In this example, sampling module 104 may direct and/or cause CPU 230 to execute and/or perform the sampling of packets 224(1)-(N). Additionally or alternatively, sampling module 104 may direct and/or cause CPU 230 to export the sampled packets to the collector. In a further example, sampling module 104 may direct and/or cause CPU 230 to uplift the sampled packets to an intermediary processing application that modifies the sampled packets (by, e.g., inserting information into the sampled packets) prior to forwarding the same to the collector.

Returning to FIG. 3, at step 320 one or more of the systems described herein may calculate a total number of the packets sampled by way of the CPU over a certain period of time. For example, calculating module 106 may, as part of network device 208 in FIG. 2, calculate the total number of packets sampled by way of CPU 230 over a certain period of time. In this example, calculating module 106 may calculate the number of packets 224(1)-(N) included in the set intercepted and/or collected at sampling points 124(1)-(N). In this example, the certain period of time may amount to and/or represent any duration (e.g., 30 seconds, 60 seconds, 90 seconds, 120 seconds, etc.) that is sufficient to meaningfully demonstrate the sample size of packets 224(1)-(N).

The systems described herein may perform step 320 in a variety of ways and/or contexts. In some examples, calculating module 106 may count the number of packets 224(1)-(N) that have been intercepted and/or flagged for sampling. In one example, calculating module 106 may direct and/or cause each sampling point to maintain a running count of the number of packets sampled from that sampling point. Additionally or alternatively, calculating module 106 may direct and/or cause each sampling domain to maintain a running count of the number of packets sampled from that sampling domain over a certain period of time.

FIG. 4 shows exemplary sampling domains 430(1) and 430(2). As illustrated in FIG. 4, sampling domain 430(1) may include and/or represent sampling points 124(1) and 124(2), and sampling domain 430(2) may include and/or represent sampling points 124(3) and 124(4). The term "sampling domain," as used herein, generally refers to a specific grouping of multiple sampling points whose statistics and/or metrics are combined for sampling and/or regulation purposes.

As illustrated in FIG. 4, packets 402, 404, and 406 may pass through sampling point 124(1) as they traverse network device 208 in connection with a communication session. In this example, sampling point 124(1) may select and/or intercept packet 404 for sampling in connection with that communication session. In contrast, sampling point 124(1) may refuse to select and/or intercept packets 402 and 406, thereby allowing those packets to continue traversing network device 208 normally without inclusion in the sample set.

As further illustrated in FIG. 4, packets 408, 410 and 412 may pass through sampling point 124(2) as they traverse network device 208 in connection with another communication session. In this example sampling point 124(2) may select and/or intercept packet 410 for sampling in connection with that other communication session. In contrast, sampling point 124(2) may refuse to select and/or intercept packets 408 and 412, thereby allowing those packets to continue traversing network device 208 normally without inclusion in the sample set.

In addition, packets 414, 416, and 418 may pass through sampling point 124(3) as they traverse network device 208 in connection with an additional communication session. In this example, sampling point 124(3) may select and/or intercept packet 416 for sampling in connection with that additional communication session. In contrast sampling point 124(3) may refuse to select and/or intercept packets 414 and 418, thereby allowing those packets to continue traversing network device 208 normally without inclusion in the sample set.

Similarly, packets 420, 422, and 424 may pass through sampling point 124(4) as they traverse network device 208 in connection with an further communication session. In this example, sampling point 124(4) may select and/or intercept packet 422 for sampling in connection with that further communication session. In contrast, sampling point 124(4) may refuse to select and/or intercept packets 420 and 424, thereby allowing those packets to continue traversing network device 208 normally without inclusion in the sample set.

Returning to FIG. 3, at step 330 one or more of the systems described herein may identify a sampling threshold that represents a target number of packets to be sampled by way of the CPU over the certain period of time. For example, threshold module 108 may, as part of network device 208 in FIG. 2, identify a sampling threshold 122 that represents a target number of packets to be sampled by way of CPU 230 over the certain period of time. In this example, the target number of packets may suffice for sampling purposes but also avoid unduly burdening and/or impairing the performance of CPU 230. Sampling threshold 122 may be formatted and/or represented as a fixed number of packets.

The systems described herein may perform step 330 in a variety of ways and/or contexts. In some examples, threshold module 108 may search for and find sampling threshold 122 in database 120. In other examples, threshold module 108 may compute sampling threshold 122 based at least in part on certain characteristics of network device 208. Examples of such characteristics include, without limitation, the make and/or model of network device 208, performance goals of network device 208, CPU usage and/or stability metrics, requirements of the communication session between computing devices 202 and 206, the system settings and/or configuration of network device 208, combinations or variations of one or more of the same, and/or any other suitable characteristics of network device 208.

In some examples, threshold module 108 may identify sampling threshold 122 by obtaining user input from an administrator responsible for network device 208. In such examples, the user input may specify the target number of packets represented by sampling threshold 122. As a specific example, the user input may indicate that network device 208 is to set sampling threshold 122 as 1,000 packets over the certain period of time.

In some examples, threshold module 108 may determine that sampling a certain number of packets would support a stable amount of CPU usage by network device 208. In such examples, threshold module 108 may apply and/or set that number of packets as the target for CPU 230 and/or one or more of sampling points 124(1)-(N). Accordingly, threshold module 108 may configure sampling threshold 122 to identify and/or represent that number of packets as the target in an effort to stabilize the usage of CPU 230 in connection with the communication session involving computing devices 202 and 206.

Returning to FIG. 3, at step 340 one or more of the systems described herein may determine that the total number of packets sampled over the certain period of time exceeds the sampling threshold. For example, threshold module 108 may, as part of network device 208 in FIG. 2, determine that the total number of packets 224(1)-(N) sampled over the certain period of time exceeds sampling threshold 122. In one example, the total number of packets 224(1)-(N) may correspond to and/or represent only those packets sampled from a single sampling point (e.g., one of sampling points 124(1)-(N)). In another example, the total number of packets 224(1)-(N) may correspond to and/or represent only those packets sampled from a single sampling domain (e.g., one of sampling domains 430(1) and 430(2)). In a further example, the total number of packets 224(1)-(N) may correspond to and/or represent all the packets sampled from all the sampling points and/or domains.

The systems described herein may perform step 340 in a variety of ways and/or contexts. In some examples, threshold module 108 may compare the total number of packets 224(1)-(N) to sampling threshold 122. Upon completion of this comparison, threshold module 108 may determine that the total number of packets 224(1)-(N) exceeds sampling threshold 122.

As a specific example, threshold module 108 may identify sampling threshold 122 in FIG. 5. As illustrated in FIG. 5, sampling threshold 122 may indicate that 1,000 is the target number of packets to be sampled over a 30-second time period. In this example, threshold module 108 may also determine and/or access sampling results 502 in FIG. 5.

As illustrated in FIG. 5, sampling results 502 may indicate that CPU 230 and/or sampling points 124(1)-(N) sampled a total of 2,000 packets. Sampling results 502 may also indicate that 500 of those packets were selected and/or intercepted at sampling point 124(1) over the 30-second sample time period. Sampling results 502 may further indicate that 1,500 of those packets were selected and/or intercepted at sampling point 124(N) over the 30-second sample time period.

In one example, sampling threshold 122 may represent a target average for sampling across sampling points 124(1)-(N). For example, because the total number of sampled packets is 2,000 across sampling points 124(1) and 124(N) is 2000, the average number of packets across sampling points 124(1) and 124(N) is 1,000. In this example, threshold module 108 may compare the 1,000-packet average from sampling points 124(1) and 124(N) against the 1,000-packet sampling threshold. By doing so, threshold module 108 may determine that the number of packets collectively sampled from sampling points 124(1) and 124(N) satisfy the 1,000-packet sampling threshold.

In another example, sampling threshold 122 may represent a target number of packets sampled from each of sampling points 124(1)-(N). In this example, threshold module 108 may compare the 500 packets selected and/or intercepted at sampling point 124(1) against the 1,000-packet sampling threshold. By doing so, threshold module 108 may determine that sampling point 124(1) sampled below and/or less than the 1,000-packet sampling threshold. However, threshold module 108 may also compare the 1,500 packets selected and/or intercepted at sampling point 124(N) against the 1,000-packet sampling threshold. Accordingly, threshold module 108 may determine that sampling point 124(N) sampled above and/or more than the 1,000-packet sampling threshold.

Figure 6:
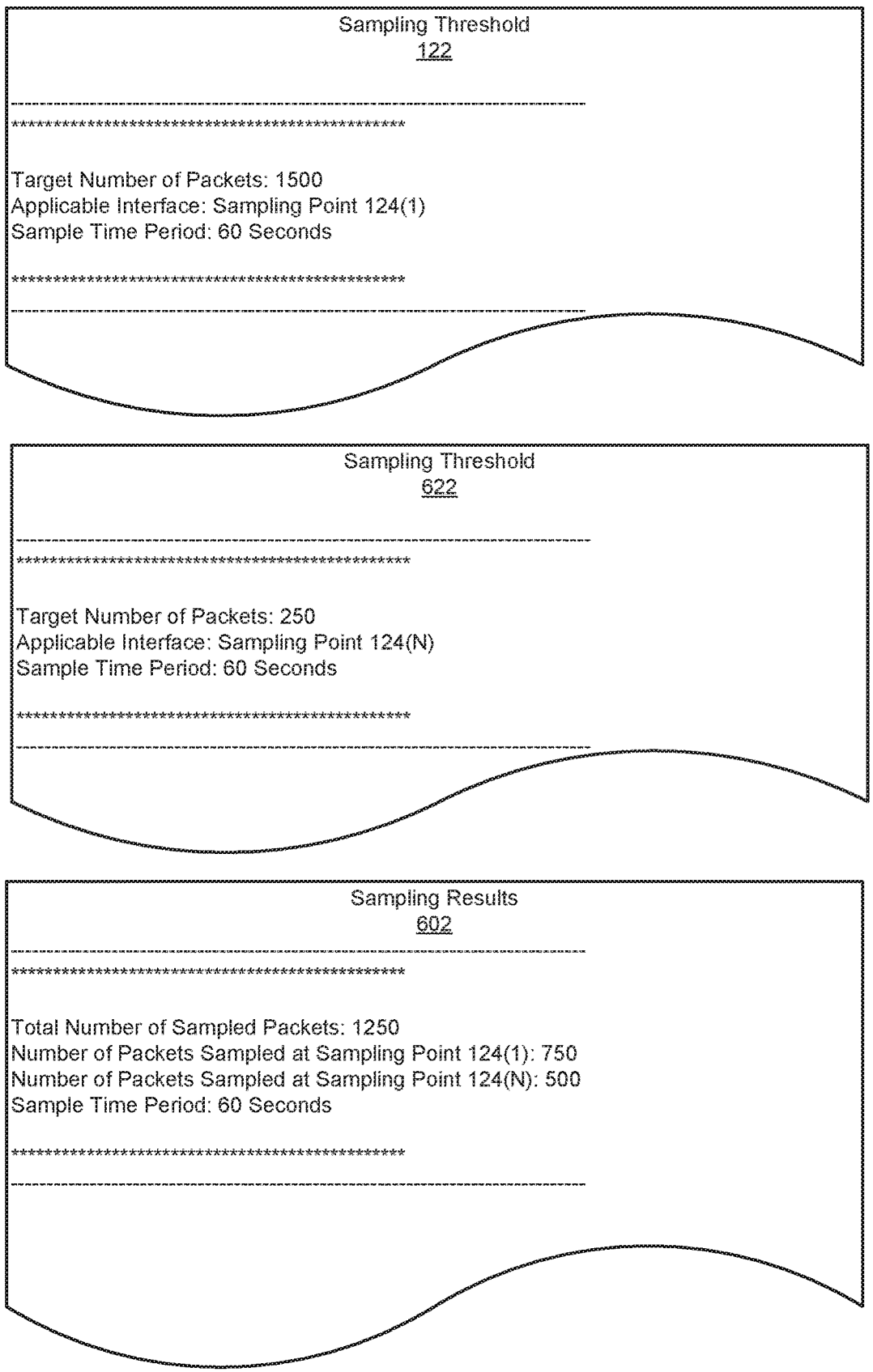
FIG. 6 is an illustration of exemplary information that identifies and/or represents sampling thresholds and sampling results.

As another specific example, threshold module 108 may identify sampling thresholds 122 and 622 in FIG. 6. As illustrated in FIG. 6, sampling threshold 122 may indicate that 1,500 is the target number of packets to be sampled from sampling point 124(1) over a 60-second time period, and sampling threshold 622 may indicate that 250 is the target number of packets to be sampled from sampling point 124(N) over the 60-second time period. In this example, threshold module 108 may also determine and/or access sampling results 602 in FIG. 6.

As illustrated in FIG. 6, sampling results 602 may indicate that CPU 230 and/or sampling points 124(1)-(N) sampled a total of 1,250 packets. Sampling results 602 may also indicate that 750 of those packets were selected and/or intercepted at sampling point 124(1) over the 60-second sample time period. Sampling results 602 may further indicate that 500 of those packets were selected and/or intercepted at sampling point 124(N) over the 60-second sample time period.

Continuing with this example, sampling threshold 122 may represent a target number of packets sampled from each of sampling points 124(1)-(N). In this example, threshold module 108 may compare the 750 packets selected and/or intercepted at sampling point 124(1) against the 1,500-packet sampling threshold. By doing so, threshold module 108 may determine that sampling point 124(1) sampled below and/or less than the 1,500-packet sampling threshold. However, threshold module 108 may also compare the 500 packets selected and/or intercepted at sampling point 124(N) against the 250-packet sampling threshold. Accordingly, threshold module 108 may determine that sampling point 124(N) sampled above and/or more than the 250-packet sampling threshold.

Returning to FIG. 3, at step 350 one or more of the systems described herein may decrease a sampling rate at which the CPU is to sample subsequent packets traversing the network in connection with the communication session that involves the plurality of computing devices. For example, rate module 110 may as part of network device 208 in FIG. 2, decrease the sampling rate at which CPU 230 is to sample subsequent and/or future packets traversing network 204 in connection with the communication session involving computing device 202 and 206. In this example, rate module 110 may initiate the decrease in the sampling rate in response to the determination that the total number of packets 224(1)-(N) exceeds sampling threshold 122.

Additionally or alternatively, rate module 110 may increase the sampling rate at which CPU 230 is to sample subsequent and/or future packets traversing network 204 in connection with the communication session involving computing device 202 and 206. In this example, rate module 110 may initiate the increase in the sampling rate in response to the determination that the total number of packets 224(1)-(N) is below sampling threshold 122.

The systems described herein may perform step 350 in a variety of ways and/or contexts. In some examples, rate module 110 may direct and/or cause CPU 230 to decrease the sampling rate such that CPU 230 processes less packets for sampling purposes than before. Additionally or alternatively, rate module 110 may direct and/or cause one or more of sampling points 124(1)-(N) to decrease the sampling rate such that those sampling points select and/or intercept less packets for sampling purposes than before.

In some examples, rate module 110 may direct and/or cause CPU 230 to increase the sampling rate such that CPU 230 processes more packets for sampling purposes than before. Additionally or alternatively, rate module 110 may direct and/or cause one or more of sampling points 124(1)-(N) to increase the sampling rate such that those sampling points select and/or intercept more packets for sampling purposes than before.

As a specific example, returning to FIG. 6, rate module 110 may decrease the sampling rate applied to sampling point 124(N) by one half. For example assuming the sampling rate applied at sampling point 124(N) was initially a 1-to-1,000 ratio, rate module 110 may halve that sampling rate to a 1-to-2,000 ratio in an effort to decrease the number of packets sampled at sampling point 124(N) from 500 to 250 over a 60-second time period, thereby preserving computing power and/or resources.

Inversely, continuing with FIG. 6, rate module 110 may increase the sampling rate applied to sampling point 124(1) by two-fold. For example, assuming the sampling rate applied at sampling point 124(1) was initially a 1-to-1,000 ratio, rate module 110 may double that sampling rate to a 1-to-500 ratio in an effort to increase the number of packets sampled at sampling point 124(1) from 750 to 1,500 over a 60-second time period, thereby providing an larger sample size.

In some examples, to initiate an increase or decrease in the sampling rate, the differential between the number of packets sampled and the target number of packets may need to satisfy a certain threshold. For example, to initiate decreasing the sampling rate at sampling point 124(N) by one half, rate module 110 may need to confirm that the number of packets (e.g., 500) sampled at sampling point 124(1) exceeded the target number of packets (e.g., 250) by a certain amount over the 60-second time period. As another example, to initiate increasing the sampling rate at sampling point 124(1) by two-fold, rate module 110 may need to confirm that the number of packets (e.g., 750) sampled at sampling point 124(1) fell short of the target number of packets (e.g., 1,500) by a certain amount over the 60-second time period.

The sampling results may serve a variety of purposes. In some examples, the sampling results may necessitate, trigger, and/or cause one or more actions to be performed. For example, calculating module 106 may calculate an amount of traffic passing through sampling points 124(1)-(N) based at least in part on the packets selected and/or intercepted at those sampling points. In this example, network device 208 and/or rate dole 110 may perform one or more actions in response to and/or based at least in part on the amount of traffic passing through those sampling points. Examples of such actions include, without limitation, generating records of traffic statistics, notifying administrators of the amount of traffic, changing the speed and/or rate of traffic, diverting and/or redirecting traffic, bringing up interfaces to assist with traffic, shutting down interfaces that are malfunctioning in connection with traffic, combinations or variations of one or more of the same, and/or any other suitable actions.

In some examples, threshold module 108 may determine that at least one of sampling points 124(1)-(N) intercepted at least a portion of packets 224(1)-(N) at an interception rate that exceeds sampling threshold 122. In response to this determination, network device 208 and/or rate module 110 may flag and/or mark that sampling point to identify it as malfunctioning. Additionally or alternatively, network device 208 and/or rate module 110 may suspend and/or shut down the malfunctioning sampling point, thereby diverting and/or redirecting traffic to an alternative route.

In some examples, rate module 110 may reduce the total number of packets sampled collectively across sampling points 124(1)-(N) to comply with the decreased sampling rate. In other examples, rate module 110 may increase the total number of packets sampled collectively across sampling points 124(1)-(N) to comply with the increased sampling rate.

In one example, network device 208 and/or sampling module 104 may form sampling domain 430(1) in FIG. 4 to include sampling points 124(1) and 124(2). In this example, network device 208 and/or sampling module 104 may also form sampling domain 430(2) in FIG. 4 to include sampling points 124(3) and 124(4). Sampling module 104 and/or rate module 110 may apply one sampling rate to sampling domain 430(1) and a different sampling rate to sampling domain 430(2). Accordingly, sampling module 104 and/or rate module 110 may regulate the sampling rate applied to sampling domain 430(1) and the different sampling rate applied to sampling domain 430(2) independently of one another.

Figure 7:
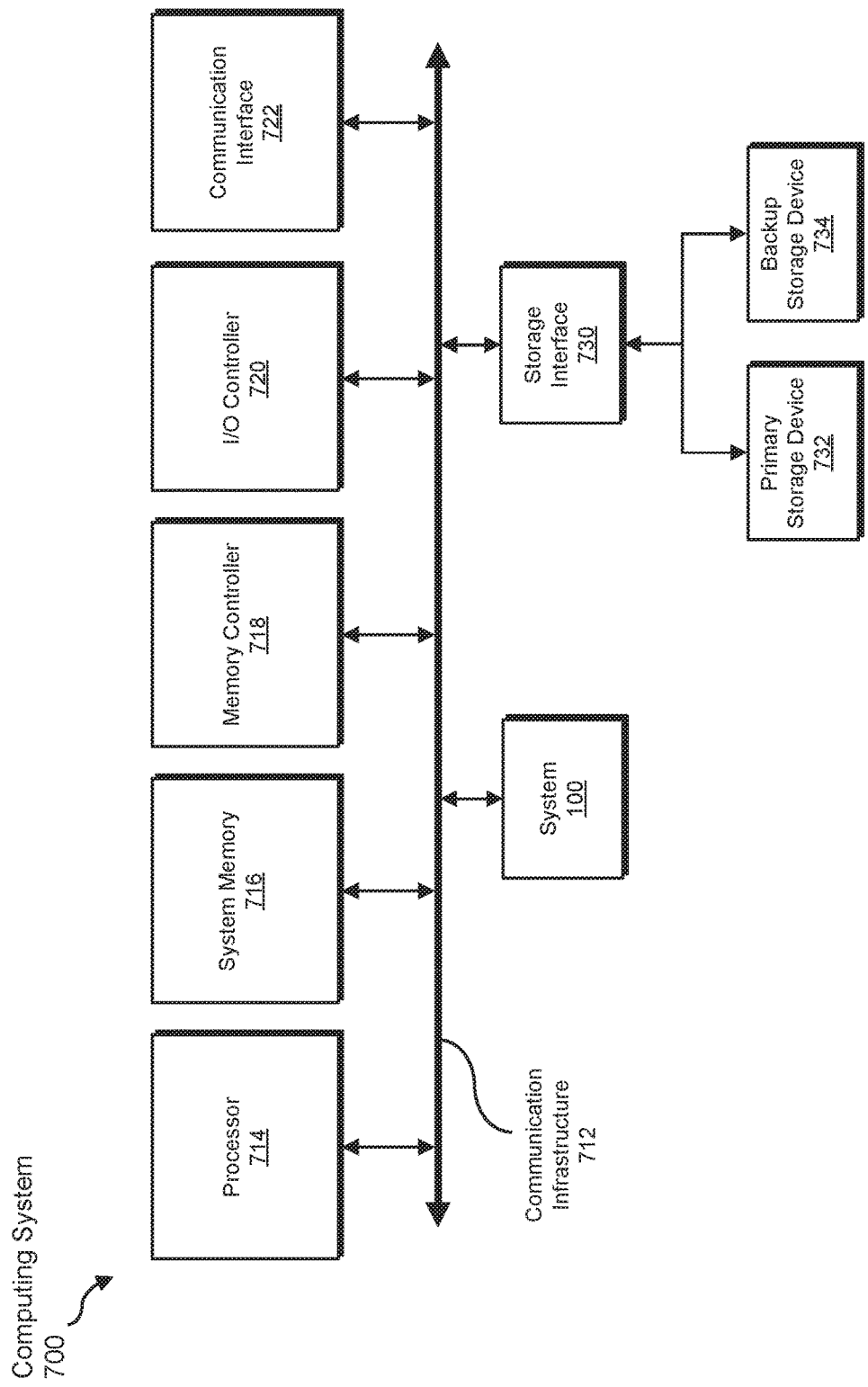
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC) a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   sampling, by way of at least one Central Processing Unit (CPU) on a network device, a set of packets traversing a network in connection with at least one communication session that involves a plurality of computing devices, wherein sampling the set of packets by way of the CPU comprises intercepting the set of packets at a plurality of sampling points within the network device;
   calculating a total number of the packets sampled by way of the CPU over a certain period of time, wherein calculating the total number of packets sampled by way of the CPU comprises calculating an amount of traffic passing through the plurality of sampling points over the certain period of time;
   identifying a sampling threshold that represents a target number of packets to be sampled by way of the CPU over the certain period of time;
   determining that the total number of packets sampled over the certain period of time exceeds the sampling threshold, wherein determining that the total number of packets exceeds the sampling threshold comprises determining that at least one of the sampling points intercepted at least one portion of the set of packets at an interception rate that exceeds the sampling threshold; and
   in response to determining that the total number of packets sampled exceeds the sampling threshold:
      decreasing a sampling rate at which the CPU is to sample subsequent packets traversing the network in connection with the communication session that involves the plurality of computing devices; and
      flagging the at least one of the sampling points that intercepted the portion of the set of packets to identify the at least one of the sampling points as malfunctioning.

2. The method of claim 1, further comprising:
   sampling, by way of the CPU at the decreased sampling rate, a set of the subsequent packets traversing the network in connection with the communication session;
   calculating a total number of the subsequent packets sampled by way of the CPU at the decreased sampling rate over a subsequent period of time;
   determining that the total number of packets sampled over the subsequent period of time is below the sampling threshold; and
   in response to determining that the total number of packets sampled is below the sampling threshold, increasing the sampling rate at which the CPU is to sample future packets traversing the network in connection with the communication session.

3. The method of claim 2, wherein increasing the sampling rate comprises doubling the sampling rate.

4. The method of claim 1, wherein decreasing the sampling rate comprises halving the sampling rate.

5. The method of claim 1, wherein the sampling rate comprises a 1-to-N ratio in which one packet is sampled for every N packets handled by the network device in connection with the communication session that involves the plurality of computing devices.

6. The method of claim 1, wherein sampling the set of packets by way of the CPU on the network device comprises:
   determining that the network device lacks a hardware-accelerated sampling device dedicated to sampling packets handled by the network device in connection with the communication session that involves the plurality of computing devices; and
   executing the sampling of the set of packets via the CPU on the network device.

7. The method of claim 1, further comprising:
   determining that the target number of packets supports a stable amount of CPU usage by the network device; and
   applying the sampling threshold to the sampling of the set of packets to stabilize the CPU usage on the network device in connection with the communication session that involves a plurality of computing devices.

8. The method of claim 1, wherein sampling the set of packets by way of the CPU on the network device comprises:
   applying the sampling rate at the sampling points within the network device; and
   processing the set of packets by way of the CPU.

9. The method of claim 8, further comprising:
   performing at least one action based at least in part on the amount of traffic passing through the sampling points over the certain period of time.

10. The method of claim 1, wherein decreasing the sampling rate comprises reducing the total number of packets sampled collectively at the sampling points within the network device to comply with the decreased sampling rate.

11. The method of claim 10, wherein the sampling points comprise at least one of:
    a packet forwarding engine;
    a routing engine;
    a physical interface card;
    a line card;
    an egress interface; and
    an ingress interface.

12. The method of claim 1, wherein sampling the set of packets by way of the CPU on the network device comprises:
    forming a first sampling domain that includes the sampling points within the network device;
    forming a second sampling domain that includes additional sampling points within the network device;

applying the sampling rate to the first sampling domain and an additional sampling rate to the second sampling domain; and regulating the sampling rate applied to the first sampling domain and the additional sampling rate applied to the second sampling domain independently of one another.

13. A system comprising:

at least one Central Processing Unit (CPU) on a network device;

a sampling module, stored in memory, that samples, by way of the CPU on the network device, a set of packets traversing a network in connection with at least one communication session that involves a plurality of computing devices, wherein sampling the set of packets by way of the CPU comprises intercepting the set of packets at a plurality of sampling points within the network device;

a calculating module, stored in memory, that calculates a total number of the packets sampled by way of the CPU over a certain period of time, wherein calculating the total number of packets sampled by way of the CPU comprises calculating an amount of traffic passing through the plurality of sampling points over the certain period of time;

a threshold module, stored in memory, that:
identifies a sampling threshold that represents a target number of packets to be sampled by way of the CPU over the certain period of time; and
determines that the total number of packets sampled over the certain period of time exceeds the sampling threshold, wherein determining that the total number of packets exceeds the sampling threshold comprises determining that at least one of the sampling points intercepted at least one portion of the set of packets at an interception rate that exceeds the sampling threshold;

a rate module, stored in memory, that:
decreases a sampling rate at which the CPU is to sample subsequent packets traversing the network in connection with the communication session in response to the determination that the total number of packets sampled exceeds the sampling threshold; and
flags the at least one of the sampling points that intercepted the portion of the set of packets to identify the at least one of the sampling points as malfunctioning; and wherein the CPU executes the sampling module, the calculating module, the threshold module, and the rate module.

14. The system of claim 13, wherein:

the sampling module samples, by way of the CPU at the decreased sampling rate, a set of the subsequent packets traversing the network in connection with the communication session;

the calculating module calculates a total number of the subsequent packets sampled by way of the CPU at the decreased sampling rate over a subsequent period of time;

the threshold module determines that the total number of packets sampled over the subsequent period of time is below the sampling threshold; and the rate module increases the sampling rate at which the CPU is to sample future packets traversing the network in connection with the communication session in response to the determination that the total number of packets sampled is below the sampling threshold.

15. The system of claim 14, wherein the rate module increases the sampling rate by doubling the sampling rate.

16. The system of claim 13, wherein the rate module decreases the sampling rate by halving the sampling rate.

17. The system of claim 13, wherein the sampling rate comprises a 1-to-N ratio in which one packet is sampled for every N packets handled by the network device in connection with the communication session that involves the plurality of computing devices.

18. The system of claim 13, wherein the sampling module:
determines that the network device lacks a hardware-accelerated sampling device dedicated to sampling packets handled by the network device in connection with the communication session that involves the plurality of computing devices; and
executes the sampling of the set of packets via the CPU on the network device.

19. An apparatus comprising:

a plurality of physical network interfaces that carry packets traversing a network in connection with at least one communication session that involves a plurality of computing devices; and at least one physical Central Processing Unit (CPU) communicatively coupled to the physical network interface, wherein the physical CPU:
samples a set of packets traversing the network in connection with the communication session that involves the plurality of computing devices, wherein sampling the set of packets comprises intercepting the set of packets at the plurality of physical network interfaces;
calculates a total number of the packets sampled over a certain period of time, wherein calculating the total number of packets comprises calculating an amount of traffic passing through the plurality of physical network interfaces over the certain period of time;
identifies a sampling threshold that represents a target number of packets to be sampled over the certain period of time;
determines that the total number of packets sampled over the certain period of time exceeds the sampling threshold, wherein determining that the total number of packets exceeds the sampling threshold comprises determining that at least one of the physical network interfaces intercepted at least one portion of the set of packets at an interception rate that exceeds the sampling threshold;
decreases a sampling rate at which the CPU is to sample subsequent packets traversing the network in connection with the communication session in response to the determination that the total number of packets sampled exceeds the sampling threshold; and
flags the at least one of the physical network interfaces that intercepted the portion of the set of packets to identify the at least one of the physical network interfaces as malfunctioning.

* * * * *